US010616468B2

(12) United States Patent
Yamazaki

(10) Patent No.: US 10,616,468 B2
(45) Date of Patent: Apr. 7, 2020

(54) FOCUS DETECTION DEVICE AND FOCUS DETECTION METHOD

(71) Applicant: Olympus Corporation, Hachioji-shi, Tokyo (JP)

(72) Inventor: Yukie Yamazaki, Tachikawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/267,346

(22) Filed: Feb. 4, 2019

(65) Prior Publication Data

US 2019/0268542 A1    Aug. 29, 2019

(30) Foreign Application Priority Data

Feb. 23, 2018 (JP) .................................. 2018-031033

(51) Int. Cl.
*H04N 5/232* (2006.01)
*H04N 5/243* (2006.01)
*G01S 3/00* (2006.01)
*G06K 9/00* (2006.01)

(52) U.S. Cl.
CPC . *H04N 5/232122* (2018.08); *H04N 5/232123* (2018.08); *H04N 5/243* (2013.01)

(58) Field of Classification Search
CPC ....... H04N 5/232122; H04N 5/232123; H04N 5/232127; H04N 5/23212; H04N 5/243; H04N 5/23219; G01S 3/00; G06K 9/00
See application file for complete search history.

(56) References Cited

U.S. PATENT DOCUMENTS

| 8,164,642 B2 | 4/2012 | Kusaka |
| 9,264,605 B2 | 2/2016 | Yamazaki et al. |
| 9,749,563 B2 | 8/2017 | Yamazaki et al. |
| 2018/0063412 A1* | 3/2018 | Uenishi .............. H04N 5/23212 |

* cited by examiner

*Primary Examiner* — Christopher K Peterson
(74) *Attorney, Agent, or Firm* — John C. Pokotylo; Pokotylo Patent Services

(57) ABSTRACT

A focus detection device, comprising an image sensor that outputs an imaging signal, and one or more processors constructed in hardware, the processor performing focus detection using a phase difference detection method based on the imaging signal, wherein the focus detection performs first focus detection based on a signal that has been obtained by subjecting the imaging signal to first filter processing, performs second focus detection based on a signal that has been obtained by subjecting the imaging signal to second filter processing if reliability of the first focus detection is lower than a specified value, and if it is determined that reliability of the second focus detection is lower than a specified value executes third focus detection based on a picture signal that has been obtained by adding a plurality of imaging signals that have been obtained at different times.

16 Claims, 10 Drawing Sheets

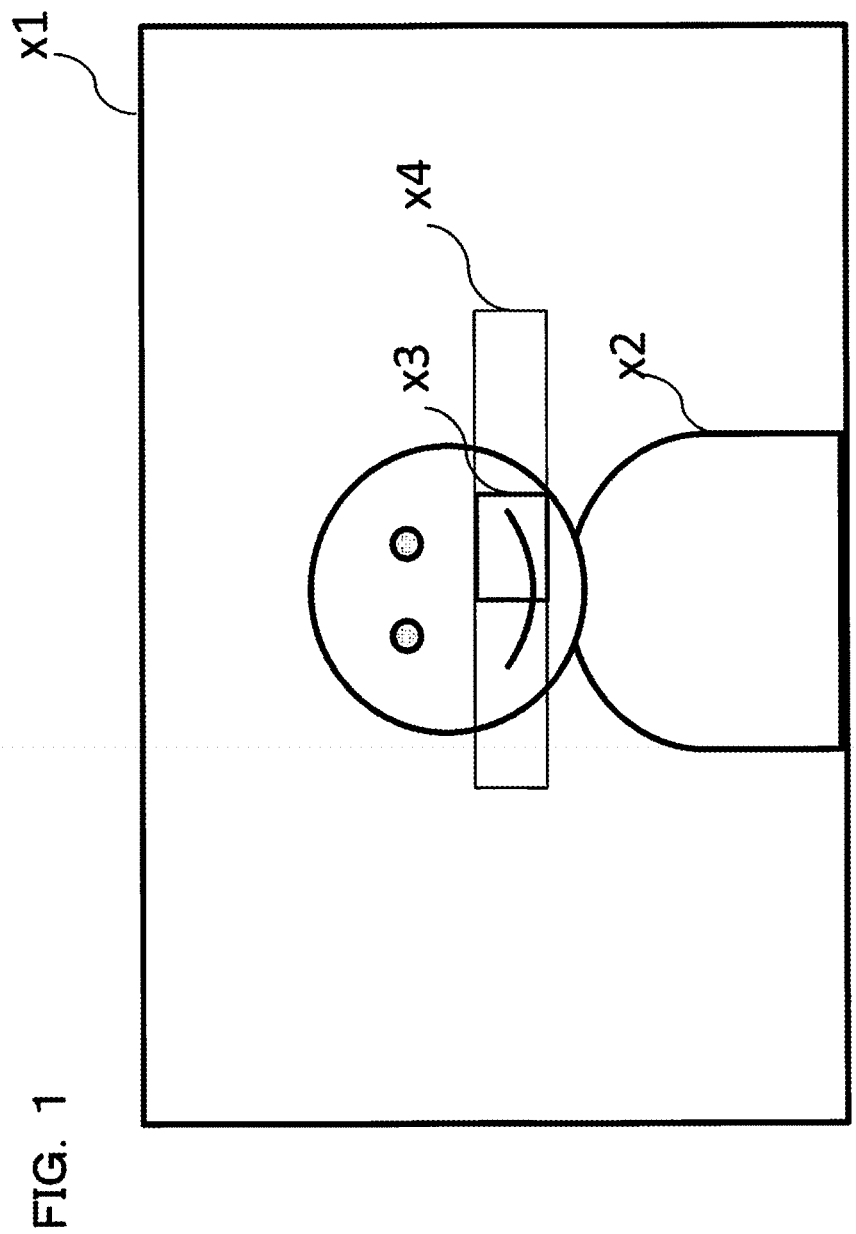

FIG. 5

| | | APERTURE | | | | |
|---|---|---|---|---|---|---|
| | | Av3 | Av4 | Av5 | Av6 | Av7 |
| SUBJECT BRIGHTNESS | BRIGHT Bvj | | | | | |
| | Bvi | | | | | |
| | Bvh | | | | | |
| | Bvg | | | | | LOW BRIGHTNESS → |
| | Bvf | | | | LOW BRIGHTNESS → | → |
| | Bve | | | LOW BRIGHTNESS → | → | → |
| | Bvd | | LOW BRIGHTNESS → | → | → | → |
| | Bvc | LOW BRIGHTNESS → | → | → | → | → |
| | Bvb | → | → | → | → | → |
| | DARK Bva | | | | | |

| SHUTTER SPEED | Tv UPPER LIMIT |
|---|---|
| ISO SENSITIVITY | Sv UPPER LIMIT |

TWO FRAME ADDITION

FOCUS DETECTION DEVICE AND FOCUS DETECTION METHOD

CROSS-REFERENCE TO RELATED APPLICATIONS

Benefit is claimed, under 35 U.S.C. § 119, to the filing date of prior Japanese Patent Application No. 2018-031033 filed on Feb. 23, 2018. This application is expressly incorporated herein by reference. The scope of the present invention is not limited to any requirements of the specific embodiments described in the application.

BACKGROUND OF THE INVENTION

1. Field of the Invention

The present invention relates to a focus detection device and focus detection method that perform focus detection for a lens using a phase difference AF method.

2. Description of the Related Art

In an imaging device such as a camera, moving a photographing lens to an in focus position is generally performed using phase difference AF. Specifically, a pair of focus detection pixel groups (phase difference detection pixel groups) receive subject light flux from different directions that are either side of the optical axis of the photographing lens, and generate pixel row data for every focus detection pixel group. Defocus amount of the photographing lens is then calculated by calculating a phase difference between this pair of pixel row data, and focus adjustment of the photographing lens is performed based on this defocus amount that has been calculated.

When calculating the phase difference from the pair of focus detection pixel row data, if the level of the pixel row data is low a focus detection not possible state arises. A focus detection device has therefore been proposed that performs focus detection by adding pairs of pixel row data in time series to increase the level of the pixel row data (refer to Japanese patent laid open number 4867552 (hereafter referred to as "patent publication 1")). Specifically, with this focus detection device, focus detection pixel data is periodically read out at a specified frame rate, and held in a memory section every time focus detection pixel data is read out, and time series data is added. Data addition continues until the level of the data resulting from addition of time series data reaches a specified value. With this processing it is possible to prevent focus detection being impossible due to the fact that data level is insufficient.

With the focus detection device that was described in patent publication 1, cumulative addition is performed until the level of data that has been added in time series reaches a specified threshold value. However, since time series addition of focus detection pixel data is performed every time focus detection pixel data is read out at a specified frame rate, the focus detection device that was described in patent publication 1 requires significant time until an in focus state is achieved. Also, in the event that a subject is moving at high speed there may be cases where it is not possible to perform focus detection.

In the case of a low contrast subject, as a method for preventing focus detection becoming impossible, besides adding data in time series there are various, such as changing filter performance, widening a focus detection area, and spatially increasing number of additions of focus detection pixels. However, with the focus detection device described in patent publication 1 focus detection pixel data is constantly and cumulatively added until the data level reaches a specified threshold value. This means that there may be cases where time required for focus adjustment becomes long, and in a case where a subject is moving, ultimately, there may be cases where it is not possible to perform focus detection.

SUMMARY OF THE INVENTION

The present invention provides a focus detection device and focus detection method that reduce the number of times when time series addition of focus detection pixel data is performed.

A focus detection device of a first aspect of the present invention comprises an image sensor that subjects light flux from an imaging optical system to photoelectric conversion using a plurality of pixels, and outputs an imaging signal, and one or more processors constructed in hardware, wherein the processor performs focus detection using a phase difference detection method based on the imaging signal, determines reliability of the focus detection, generates a picture signal by adding a plurality of imaging signals that have been acquired at different times by the image sensor, performs first filter processing to apply a differential filter for a specified frequency band, and performs second filter processing to apply a differential filter for a frequency band that is lower than that for the first filter processing, wherein the focus detection performs first focus detection based on a signal that has been obtained by subjecting the imaging signal to the first filter processing, performs second focus detection based on a signal that has been obtained by subjecting the imaging signal to the second filter processing if reliability of the first focus detection is lower than a specified value, and if it is determined that reliability of the second focus detection is lower than a specified value executes third focus detection based on a picture signal that has been obtained by adding the plurality of imaging signals that have been obtained at different times.

A focus detection device of a second aspect of the present invention comprises an image sensor that subjects light flux from an imaging optical system to photoelectric conversion using a plurality of pixels, and outputs an imaging signal, and one or more processors constructed in hardware, wherein the one or more processors perform focus detection using a phase difference detection method based on the picture signal, change phase difference detection range when performing the focus detection, determine reliability of the focus detection, and generate a picture signal by adding a plurality of imaging signals that have been acquired at different times by the image sensor, wherein the focus detection performs first focus detection based on the imaging signal, if reliability of the first focus detection is lower than a specified value, widens the phase difference detection range and performs second focus detection based on the imaging signal of this phase difference detection range that has been expanded, and if it is determined that reliability of the second focus detection is lower than a specified value executes third focus detection based on a picture signal that has been obtained by adding the plurality of imaging signal that have been obtained at different times.

A focus detection method of a third aspect of the present invention, for an imaging device that comprises an image sensor that subjects light flux from an imaging optical system to photoelectric conversion using a plurality of pixels, and outputs an imaging signal, a first filter circuit that applies a differential filter of a specified frequency band, and a second filter circuit that applies a differential filter of a frequency band that is lower than that for the first filter circuit, comprising performing focus detection using a phase difference detection method based on the imaging signal, determining reliability of the focus detection, and generating a picture signal by adding a plurality of imaging signals that have been acquired at different times by the image sensor, wherein the focus detection performs first focus detection based on a signal that has been obtained by processing the imaging signal using the first filter circuit, performs second focus detection based on a signal that has been obtained by processing the imaging signal using the second filter circuit if reliability of the first focus detection is lower than a specified value, and if it is determined that reliability of the second focus detection is lower than a specified value executes third focus detection based on a picture signal that has been obtained by adding the plurality of imaging signal that have been obtained at different times.

A focus detection method of a fourth aspect of the present invention, for an imaging device that comprises an image sensor that subjects light flux from an imaging optical system to photoelectric conversion using a plurality of pixels, and outputs an imaging signal, comprising performing focus detection using a phase difference detection method based on the imaging signal, changing phase difference detection range when performing the focus detection, determining reliability of the focus detection, and generating a picture signal by adding a plurality of imaging signals that have been acquired at different times by the image sensor, wherein the focus detection performs first focus detection based on the imaging signal, if reliability of the first focus detection is lower than a specified value, widens the phase difference detection range and performs second focus detection based on the imaging signal of this phase difference detection range that has been expanded, and if it is determined that reliability of the second focus detection is lower than a specified value executes third focus detection based on a picture signal resulting from adding the plurality of imaging signal that have been obtained at different times.

BRIEF DESCRIPTION OF THE DRAWINGS

FIG. 1 is a drawing showing examples of focus detection areas, in a camera of one embodiment of the present invention.

FIG. 5 is a table showing one example of a correspondence relationship between subject brightness and aperture value, in the camera of one embodiment of the present invention.

DETAILED DESCRIPTION OF THE PREFERRED EMBODIMENTS

An example where a digital camera (hereafter abbreviated to "camera") is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a shooting (release) operation, image data is stored in a storage medium. Image data that has been stored in the storage medium can be played back and displayed on the display section if playback mode is selected.

Figure 10:
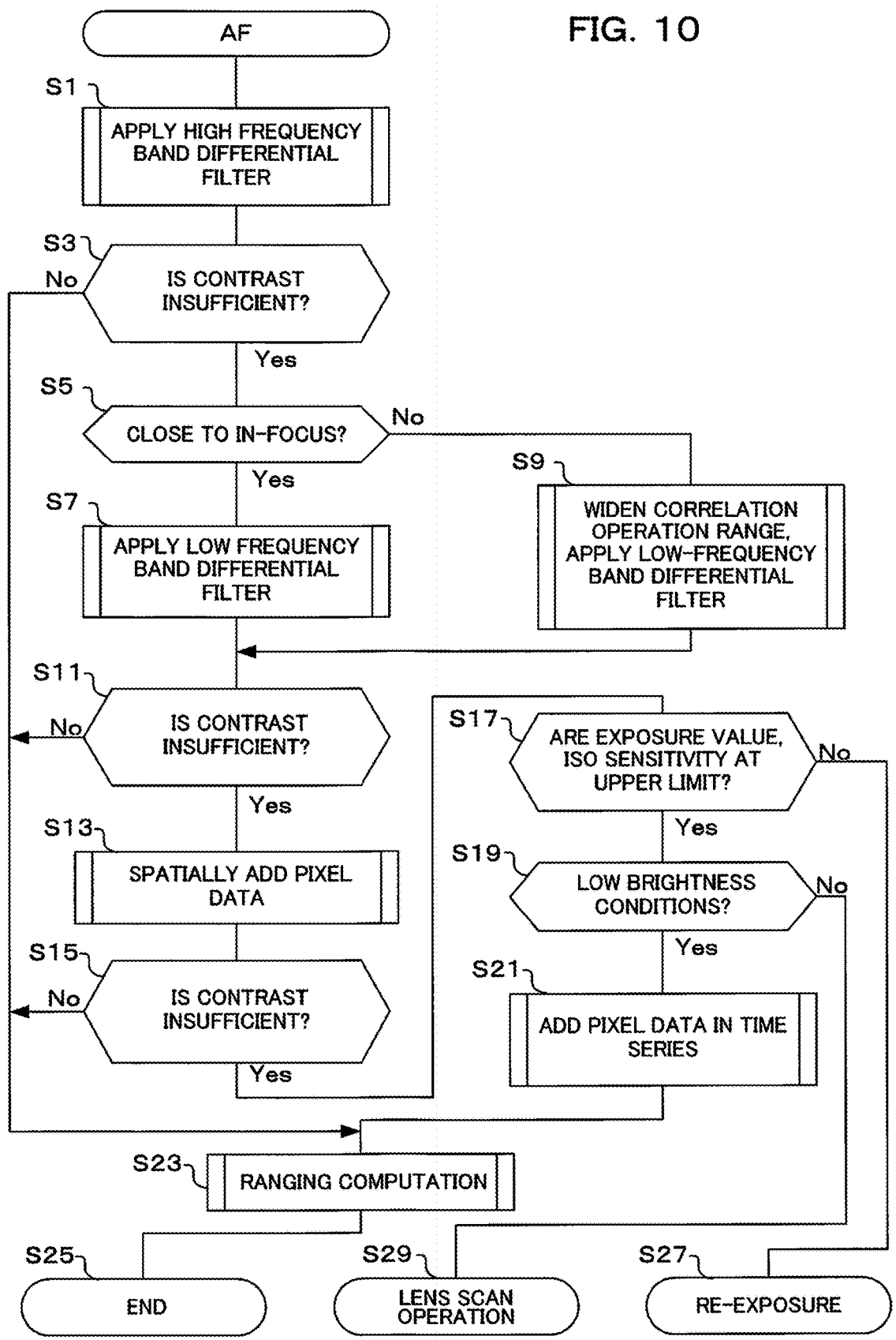
FIG. 10 is a flowchart showing AF operation of the camera of one embodiment of the present invention.

Also, with this embodiment, in the event that focus detection reliability is low due to contrast value of a subject being low, focus detection pixel data that has been acquired at different times is added, and focus detection is performed using this added pixel data (refer, for example, to S21 and S23 in FIG. 10). However, with this embodiment time is required to acquiring added pixel data and it is not possible to perform focus detection rapidly. Therefore, before generating added pixel data band properties of a differential filter that processes pixel data are changed (refer, for example, to FIG. 2A, FIG. 2B, and S7 in FIG. 10), a correlation operation range (focus detection area) is changed (refer, for example, to FIG. 3A, FIG. 3B and S9 in FIG. 10), pixel data is spatially added (refer, for example, to FIG. 4A, FIG. 4B, and S13 in FIG. 10), and exposure control for AF is changed (refer, for example, to FIG. 5 and S17 and S19 in FIG. 10). Regardless of these processes, if focus detection reliability is low focus detection is performed using added pixel data.

Before describing this embodiment, an overview of the focus detection of this embodiment will first be described. FIG. 1 shows an example of subject image and focus detection area. Subject image x2 is formed on imaging surface x1 of an image sensor, and focus detection areas x3 and x4 are ranges in which focus detection is performed for this subject image. Imaging pixels for generating image data are formed over the whole surface of imaging surface x1, and focus detection elements for focus detection are arranged between these imaging pixels. Within focus detection pixel data that has been read out from the image sensor 21, only focus detection pixel data that is contained in the focus detection areas x3 and x4 are extracted, and used in focus detection using phase difference AF (refer to the AF ranging point setting section 33 and the focus detection pixel generating section 34 in FIG. 8, which will be described later).

In FIG. 1, the subject image x2 is formed on the imaging surface x1. In order to perform focus detection for this subject image x2, a normal focus detection area x3 and a wide focus detection area x4 that is laterally spread and includes this normal focus detection area x3, are provided. With the example shown in FIG. 1, the normal focus detection area x3 includes the lips etc. of a person, and this portion has a flesh color and low contrast.

Figure 2A:
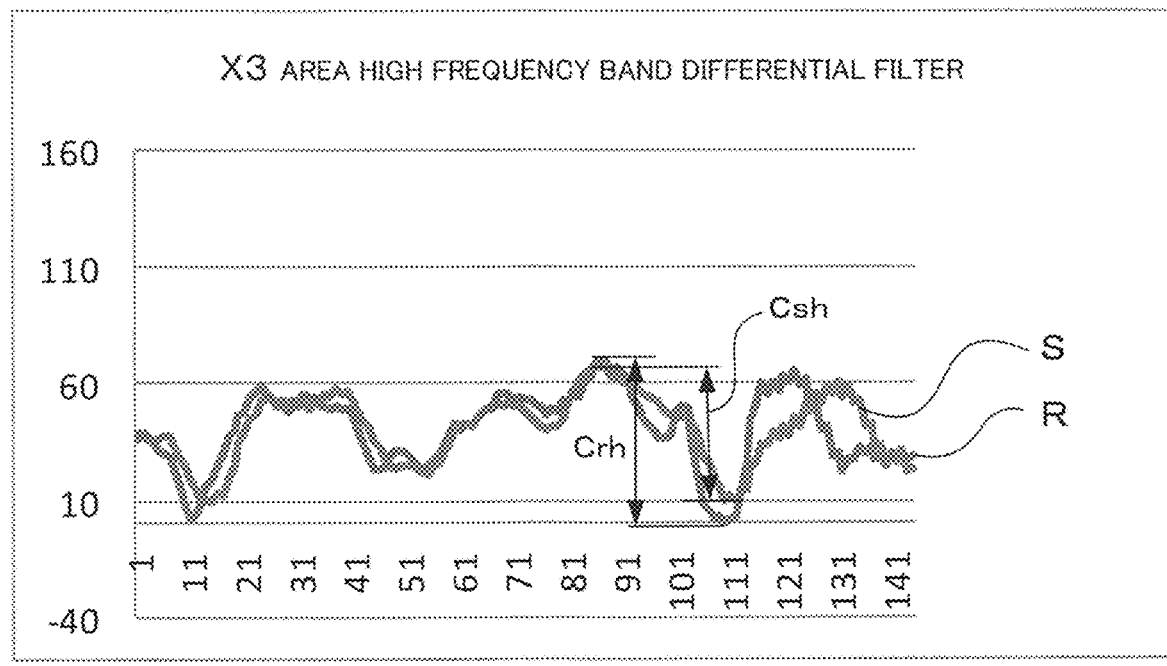
FIG. 2A and FIG. 2B are graphs showing examples of change in focus detection pixel data in a case where characteristics of a differential filter have been change, in the camera of one embodiment of the present invention.
Figure 2B:
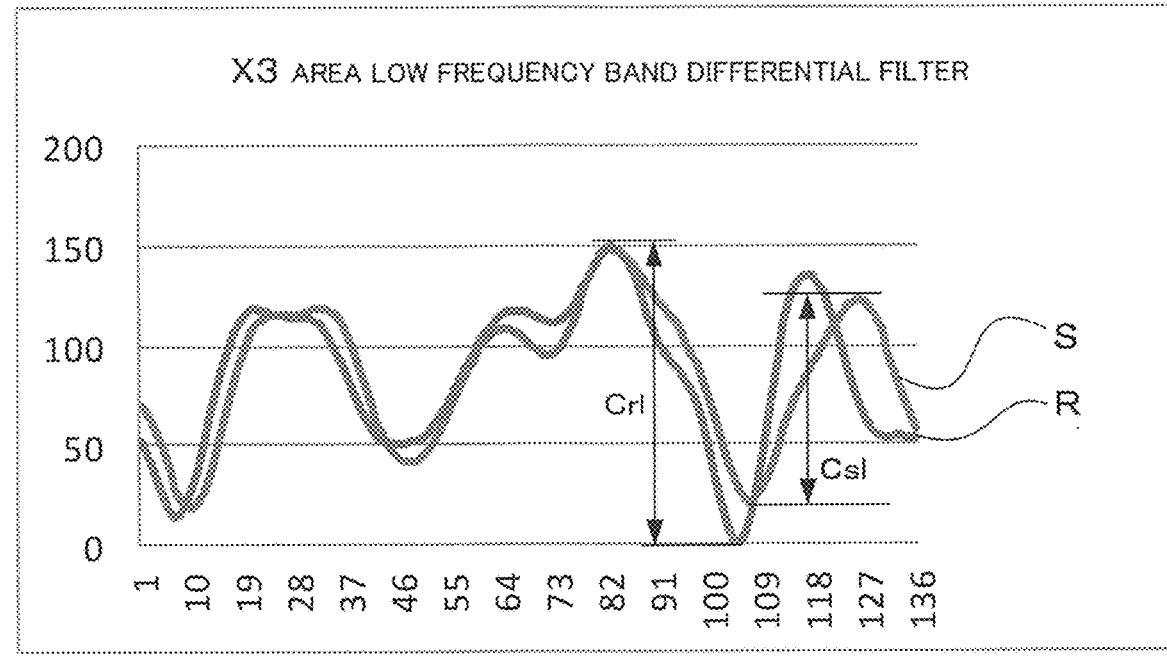

FIG. 2A and FIG. 2B show focus detection pixel data for this type of low contrast subject. In FIG. 2A and FIG. 2B, the horizontal axis represents position of focus detection pixels, while the vertical axis represents pixel data (output value) of each focus detection pixel. As was described previously, with phase difference AF a pair of focus detection pixel groups (phase difference detection pixel groups) receive subject light from different directions that are either side of the optical axis of the photographing lens. An AF computation section then performs a correlation operation using a pair of pixel row data from the focus detection pixel groups, and calculates a phase difference. Direction of phase difference detection is an elongated (sideways) direction of the imaging plane of FIG. 1, and corresponds to the horizontal axis direction in FIG. 2A and FIG. 2B. In FIG. 2A and FIG. 2B, standard S is pixel data of a focus detection pixel group that receives subject light from one direction, while reference R is pixel data of a focus detection pixel group that receives subject light from another direction.

FIG. 2A shows pixel data after having subjected pixel data that has been output from a focus detection pixel group to filter processing with a high frequency band differential filter. Also, FIG. 2B shows change in pixel data after having subjected pixel data that has been output from a focus detection pixel group to filter processing with a low frequency band differential filter. As was described previously, the subject of the normal focus detection region x3 in FIG. 1 has low contrast. This means that a difference between a maximum value and a minimum value of pixel data for the focus detection pixel group of standard S shown in FIG. 2A, and a difference between maximum value and minimum value of pixel data of the focus detection pixel group of reference R, are small, and detection accuracy (focus detection accuracy) of a phase difference using correlation operation becomes low.

However, as will be understood from comparison of FIG. 2A and FIG. 2B, output that has been subjected to differential processing by the low frequency band differential filter has a larger difference between maximum value and minimum value of focus detection pixel data, and a contrast value becomes larger. This means that pixel data that has been processed by the low frequency band differential filter has a higher focus detection precision using a correlation operation after that processing. As shown in FIG. 2A, in a case of performing high frequency band differential processing, contrast value of the focus detection pixel data is insufficient, and there may be cases where focus detection becomes impossible. With this embodiment, therefore, in the event that contrast value of focus detection pixel data is low a correlation operation is performed after performing filter processing using a low frequency band differential filter (refer, for example, to S7 in FIG. 10).

It should be noted that with the examples shown in FIG. 2A and FIG. 2B, contrast value is a difference Csh, Csl between maximum value and minimum value of pixel data for standard S, and a difference Crh, Crl between maximum value and minimum value of pixel data for reference R. Two respective contrast values are calculated from the two sets of focus detection pixel data for standard S and reference R. With this embodiment, the contrast value that is smallest, between the contrast value for standard S and the contrast value for reference R, is made a representative value of contrast value for focus detection pixel data. A contrast value calculation method is not limited to the methods shown in FIG. 2A and FIG. 2B, and contrast value may be obtained from an accumulated value etc. of difference between adjacent pixels.

Figure 3A:
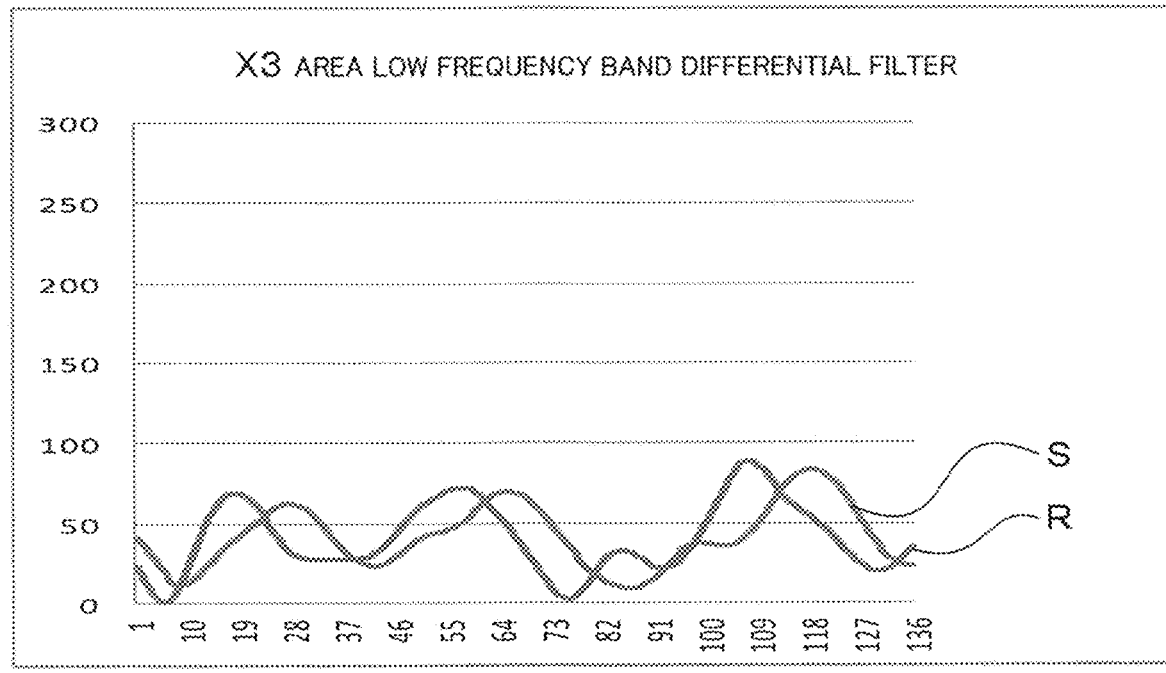
FIG. 3A and FIG. 3B are graphs showing examples of change in focus detection pixel data in a case where focus detection area width has been change, in the camera of one embodiment of the present invention.
Figure 3B:
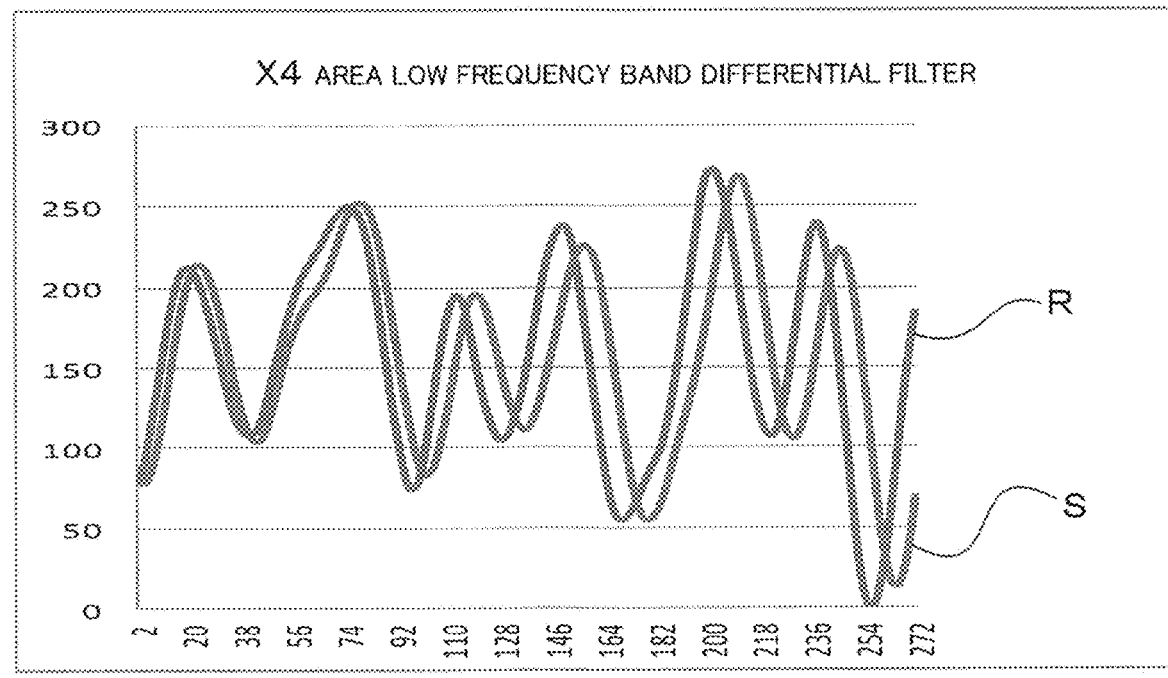

Also, when the subject is in a defocused state, there may be cases where a contrast value is insufficient, even if there has been processing using a differential filter for a low frequency band. This point will be described using the examples shown in FIG. 3A and FIG. 3B. With the example shown in FIG. 1 the normal focus detection area x3 and the wide focus detection area x4 are provided. FIG. 3A and FIG. 3B show a case where width of the focus detection area is changed in the case of performing processing using a low frequency band differential filter in a defocused state. Specifically, FIG. 3A shows focus detection pixel data of normal focus detection area x3, and FIG. 3B shows focus detection pixel data of wide focus detection area x4. It should be noted that in FIG. 3A and FIG. 3B, the horizontal axis shows position of focus detection pixels, similarly to FIG. 2A and FIG. 2B.

With the example shown in FIG. 3A, processing is performed using a low frequency band differential filter such as was shown in FIG. 2B, but contrast value is insufficient. As will be understood if FIG. 3A and FIG. 3B are compared, a difference between the maximum value and minimum value of focus detection pixel data is larger in a case where differential processing is performed by widening the focus detection range from normal focus detection area x3 to wide focus detection area x4, and contrast value becomes large. This means that performing a correlation operation using focus detection pixel data from the wide focus detection area yields higher focus detection precision. Therefore, with this embodiment, in a case where a correlation operation is performed using focus detection pixel data from the normal focus detection area x3, as in FIG. 3A, if contrast value is low then a correlation operation is performed after widening the focus detection area (refer, for example, to S9 in FIG. 10).

There may also be cases where contrast value for focus detection pixel data is insufficient even if a differential filter or a focus detection area are changed. In this case, there is a method of spatially adding focus detection pixel data. This method will be described using the examples shown in FIG. 4A and FIG. 4B.

Figure 4A:
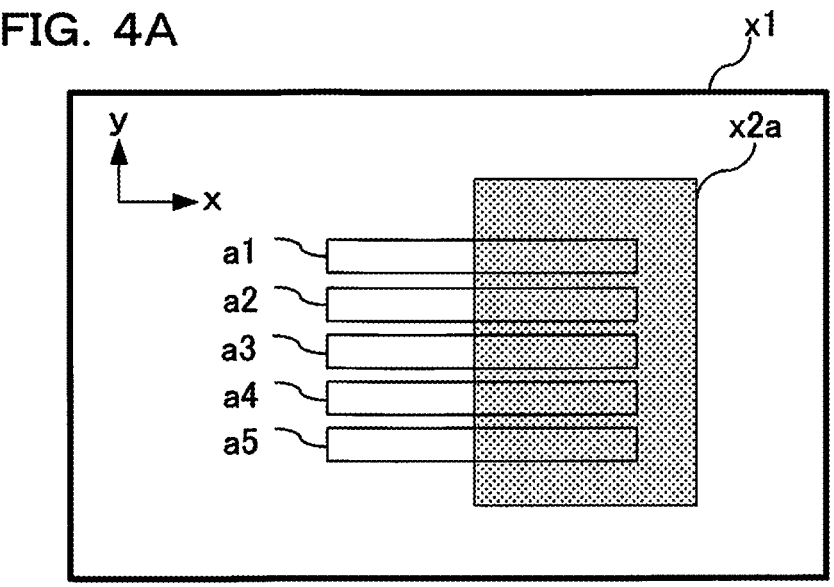
FIG. 4A and FIG. 4B are drawings for describing spatial addition of focus detection pixel data, in the camera of one embodiment of the present invention.
Figure 4B:
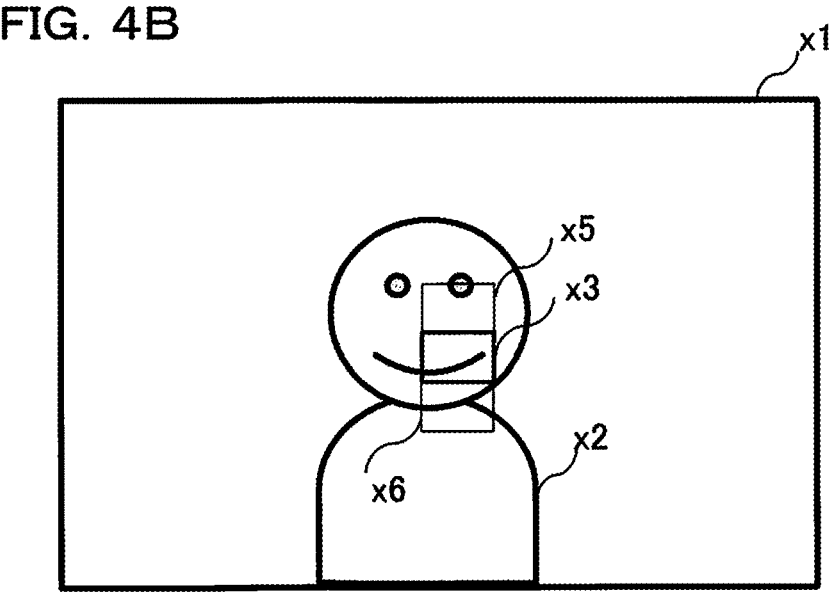

In FIG. 4A, focus detection pixel rows a1 to a5 have focus detection pixels respectively arranged in a lateral direction (x direction) in each row. Spatial addition is the respective addition of pixel data of focus detection pixels in each focus detection pixel row with pixel data of corresponding focus detection pixels in rows above and below (y direction), and making an added value focus detection pixel data for respective x direction positions.

For example, in focus detection pixel row a1, pixel data at position x[1] in an X direction on the imaging surface is made a1x[1], pixel data at position x[2] is made a1x[2], . . . Similarly, in focus detection pixel row a2, pixel data at position x[1] on the imaging surface is made a2x[1], pixel data at position x[2] is made a2x[2], . . . Values of pixel data are similarly determined in focus detection pixel rows a3, a4 and a5 also. In this case, focal point pixel data that has been spatially added becomes (a1x[1]+a2x[1]+a3x[1]+a4x[1]) at position x[1], and becomes (a1x[2]+a2x[2]+a3x[2]+a4x[2]) at position x[2]. Subsequently, for position x[3] also, at corresponding positions each focus detection pixel data for focus detection pixel rows a1 to a5 are added In this way, with this embodiment, pixel data for focus detection pixels at corresponding positions above and below (Y direction) are added using spatial addition (refer, for example, to S13 in FIG. 10). As a result of adding, contrast value of focus detection pixel data becomes large and it is possible to improve focus detection precision. In the case of subject x2a, such as shown in FIG. 4A, if focus detection is performed with only focus detection pixel row a3, there may be cases where contrast value is insufficient. However, sufficient contrast value is obtained by spatially adding focus detection pixel data for focus detection pixel rows a1 to a5 positioned above and below (y direction), and there are cases where it is possible to improve focus detection precision. In the case of the subject such as shown in FIG. 4A, since positions in the X direction of a portion where contrast occurs substantially coincide in the vertical direction (y direction), spatial addition of focus detection pixel data for focus detection pixel rows a1 to a5 becomes effective.

It should be noted that with the example that was shown in FIG. 4A, the phase difference detection direction is the horizontal direction (X direction), and so pixels are added in the vertical direction (Y direction). In a case where focus detection pixel rows are arranged in the vertical direction (y direction) in order to perform Y direction phase difference detection, pixels may be added in the horizontal direction (x direction). Also, in a case where focus detection pixel rows are arranged in an inclined direction in order to perform phase difference detection in an inclined direction, addition may be in an inclined direction that has been rotated by 90° from the inclined direction in which the focus detection pixels have been arranged. Further, with the example shown in FIG. 4A focus detection pixel rows are the five rows a1 to a5. However, this number of rows is exemplary, and there may be more or less than five rows.

In this way, by spatially adding pixel data of focus detection pixel rows, it is possible to obtain pixel data having a sufficient contrast value. However, with the example shown in FIG. 4B it is not possible to make contrast high even with spatial addition. In the example shown in FIG. 4B, in addition to normal focus detection area x3, pixel data of focus detection pixel rows of focus detection area x5 and focus detection area x6 are spatially added. However, in this case, patterns of subject picture signals are all different for focus detection area x3, focus detection area x5 and focus detection area x6, and since positions in the X direction where contrast respectively occurs are different it is not possible to increase contrast value even with spatial addition.

As has been described above, with this embodiment, in the case of a low contrast subject, (1) a low frequency band differential filter is used (2) pixel data is acquired in a wide focus detection area, and (3) pixel data is spatially added. As a result of adopting these methods, contrast value of focus detection pixel data becomes large and it is possible to improve focus detection precision. It should be noted that the order of performing (1) to (3) is not limited to that shown, and may be made different. Also, all three, or only some, of these procedures may be performed in parallel.

Even if the three above described methods are adopted, there may be cases where contrast value of focus detection pixel data is insufficient. In such a case there is a possibility that a subject has low brightness, and that the output of the focus detection pixel data is not sufficient. In this case, output of focus detection pixel data may be increased using exposure control for AF (for focus detection).

Ordinarily, performing focus detection using pixel data of focus detection pixel rows is performed in a shooting preparation operation (with a camera, when a release button has been pressed down halfway (at the time of 1st release)). At this time, exposure control for focus detection pixels is different to exposure control at the time of a shooting operation for stored images that will be stored (with a camera, when the release button has been pressed down fully, at the time of 2nd release).

Therefore, with this embodiment, in a case where a contrast value of focus detection pixel data is insufficient, in the event that a shutter speed Tv (Time Value) value for AF exposure control, or an ISO sensitivity Sv value (Sensitivity Value), do not reach an upper limit, exposure conditions (shutter speed Tv value, ISO sensitivity Sv value) are changed and exposure processing is performed again (refer to S17 and S27 etc. in FIG. 10). Specifically, shutter speed Tv value or ISO sensitivity Sv value are increased to make exposure amount large, and exposure and focus detection are performed again. If the result of this is that contrast of focus detection pixel data is insufficient, the shutter speed Tv value and the ISO sensitivity Sv value are increased and exposure and focus detection repeated again, until the shutter speed Tv value or the ISO sensitivity Sv value reached the upper limit (S17 and S17 in FIG. 10).

Also, even if the shutter speed Tv value and the ISO sensitivity Sv value have reached their upper limit, if AF exposure conditions are not low brightness conditions, which will be described later, a lens scan operation is executed (FIG. 10: S19, S19). A lens scan operation involves repeatedly performing exposure for AF and focus detection while scanning a focus lens in a range in which shooting is possible from close up to infinity, and searching for a focus lens position at which focus detection is possible. In the event that a lens scan operation has been executed and a focus lens position at which focus detection is possible has been found, an AF operation continues. On the other hand, in the event that a focus lens positioned where focus detection is possible has not been found even though the lens scan operation has been executed, it is recognized as being unfocused In this way, in a state where shutter speed Tv value and ISO sensitivity Sv value have not reached their upper limit, or in a case where low brightness conditions are not satisfied, time series frame addition (refer to patent publication 1 that was described earlier) is prevented from starting. In this way it is possible to prevent unnecessary startup of frame addition.

Whether or not low brightness conditions are satisfied is determined based on a combination of subject brightness and aperture AV (Aperture Value). FIG. 5 shows a correspondence relationship between subject brightness By value and lens aperture Av value. An upper limit for shutter speed Tv value is determined depending on frame rate for image sensor readout mode. If frame rate is fast, the upper limit for shutter speed Tv also becomes high-speed. Whether or not there are low brightness conditions is determined in accordance with lens aperture AV value. For example, with the example shown in FIG. 5, in a case where aperture Av value is Av3, low brightness conditions are determined if subject brightness is less than or equal to Bvc. In a case where aperture Av value is Av7, low brightness conditions are determined if subject brightness is less than or equal to Bvg. Therefore, in the event that shutter speed Tv value and ISO sensitivity Sv value have reached their upper limit, and low brightness conditions have been determined, time series frame addition processing for focus detection pixel data is performed. In this way, focus detection pixel data of a sufficient level is obtained.

Figure 6:
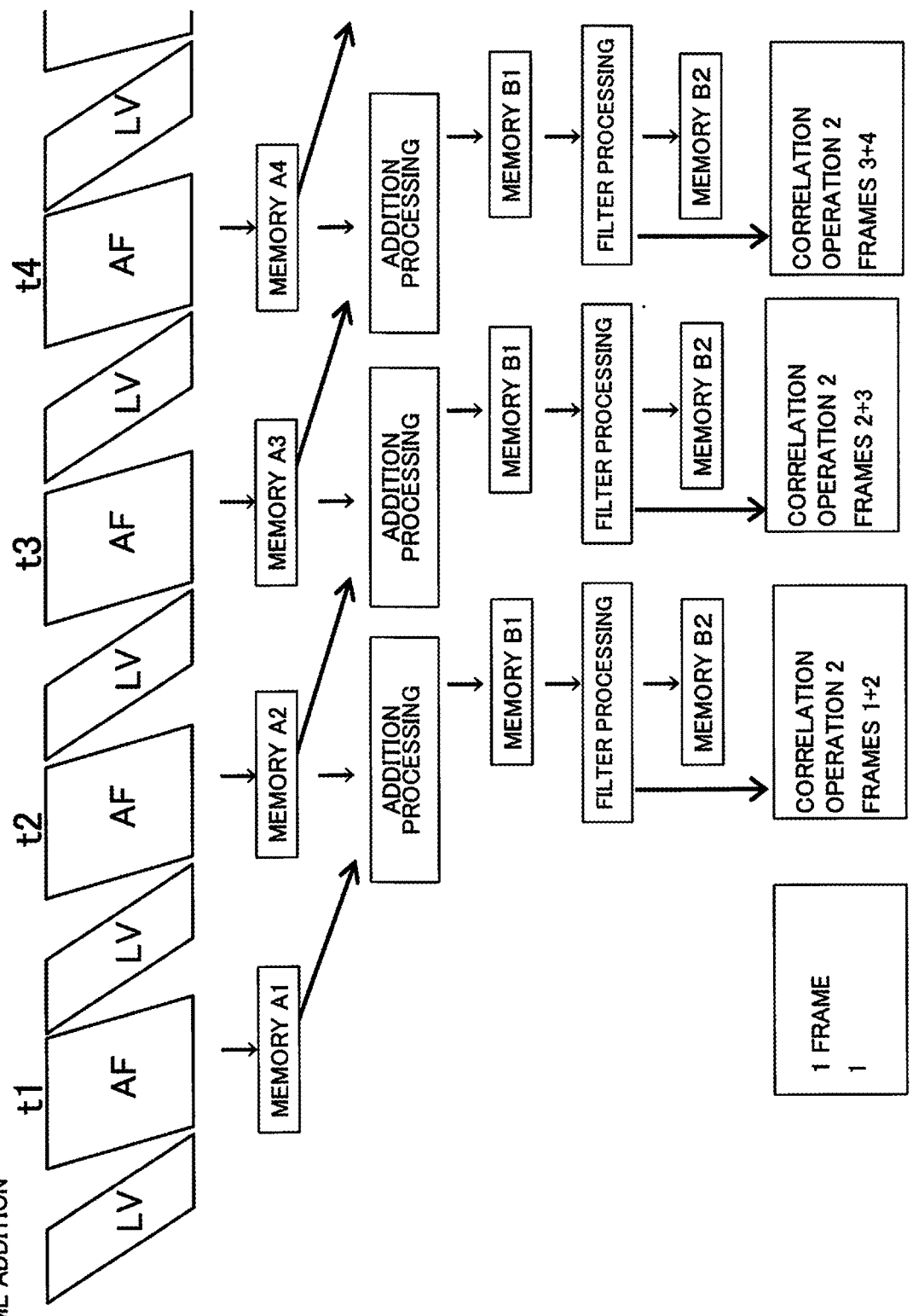
FIG. 6 is a drawing showing a procedure for two frame addition processing, in the camera of one embodiment of the present invention.

Next, time series frame addition processing will be described using FIG. 6. Exposure mode of the image sensor is shown at the upper part of FIG. 6. Specifically, LV represents a period in which exposure for live view is performed, and AF represents a period in which exposure for focus detection is performed. It should be noted that FIG. 6 showing exposure period is a schematic diagram, and the LV exposure period and the AF exposure period are not proportional.

If exposure for AF is performed in exposure period t1 and focus detection pixel data is read out, this pixel data is stored in memory A1. If exposure for AF is performed in exposure period t2 and focus detection pixel data is read out, this pixel data is stored in memory A2. Subsequently, every time focus detection pixel data is read out it is stored in memory. If exposure period t2 has elapsed and focus detection pixel data has been stored in memory, the image processing section 22 (refer to FIG. 7) performs addition processing, and resulting data is stored in memory B1. Next, filter processing is performed on image data that have been subjected to addition processing, and the result of this filter processing is stored in memory B2. Also, a correlation operation is performed using focus detection pixel data that has been subjected to addition processing and filter processing.

The correlation operation here is performed using data resulting from having performed addition processing on focus detection pixel data of two frames. With focus detection pixel data for one frame, even if contrast value is insufficient, it is possible to improve precision of focus detection by making contrast value higher by adding focus detection pixel data for two frames. In the event that contrast value is insufficient even though addition has been performed for two frames, the number of added frames is sequentially increased to three frame addition, four frame addition, etc.

However, as was described previously, if time series frame addition is performed the time required to perform focus detection becomes long. With this embodiment therefore, it is possible to prevent frequently increasing the number of added frames for time series frame addition processing.

Specifically, as a condition for increasing the number of frame additions, there is contrast value of the focus detection pixel data being insufficient, and all of the following items being satisfied.
(i) Conditions for reducing the number of frame additions (conditions a and b which will be described later) are not satisfied.
(ii) Number of frame additions is not reduced immediately after a shooting preparation operation (with a camera, 1st release being pressed down halfway). (In a target focus detection area, saturation is not detected even once.)

Here, immediately after a shooting preparation operation (with a camera, pressing down of 1st release) is a period until the release button is subjected to 1/2 press, and the focus lens is moved to an in focus position as result of focus detection. Also, saturation of a target focus detection area is a case where, among focus detection pixel data contained in the target focus detection area (may also include a case where addition processing has been performed), a value of a specified proportion or more of focus detection pixel data is saturated. Saturation is, for example, a case where, if pixel data is 8 bits, a value is 255 when converted to decimal. Specifically, there may be cases where all bits of the pixel data are 1.

(iii) While maintaining a shooting preparation operation (with the camera, 1st release), conditions (i) and (ii) are successively satisfied.

Also, conditions for reducing the number of frame additions are as follows.
(a) Immediately after a shooting preparation operation (1st release pressed down), with the result after the current frame addition processing saturation is detected at least once within target focus detection areas.
(b) While maintaining a shooting preparation operation (1st release), condition (a) continues to be satisfied.

While maintaining a shooting preparation operation (1st release), there may be cases where if computation conditions are changed too often, the effects of noise due to an unwanted subject are felt. For this reason the number of frame additions is only changed in cases where the same determination result continues successively.

Figure 7:
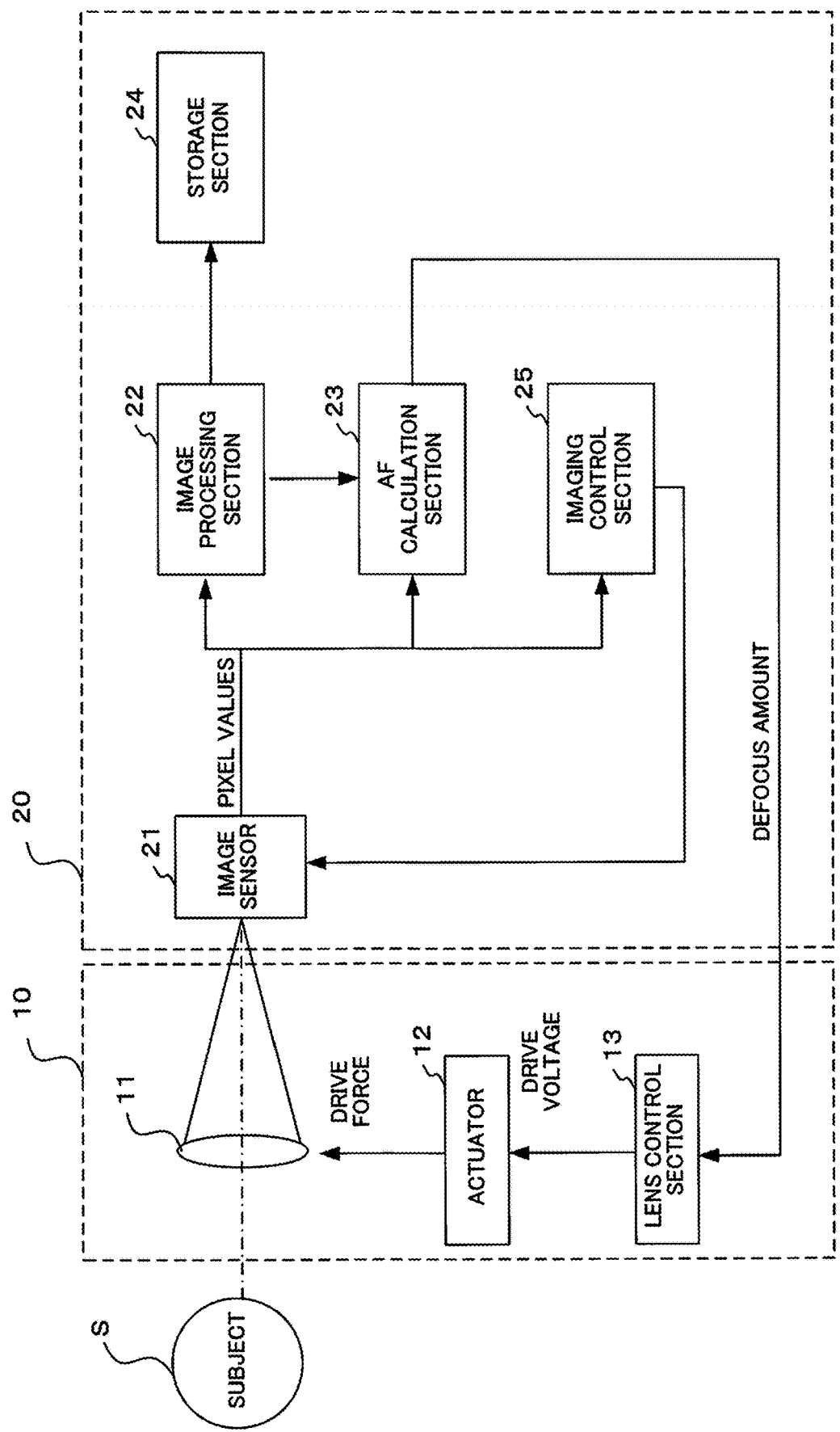
FIG. 7 is a block diagram mainly showing the electrical structure of a camera of one embodiment of the present invention.

Next, the structure of an embodiment of the present invention will be described using FIG. 7. A camera relating to this embodiment comprises an interchangeable lens 10 and a camera body 20. With this embodiment, the interchangeable lens 10 and a camera body 20 are configured separately, but they may also be constructed integrally, like a general compact camera with which a lens cannot be interchanged. Also, the camera of this embodiment divides subject light that has passed through the photographing lens into to two light fluxes using a pupil division method, and a pair of focus detection pixel groups subject each light flux to photoelectric conversion to generate image data. A phase difference is then calculated using the image data (focus detection pixel data), and a focus adjustment operation is performed based on this phase difference.

A photographing lens 11 is arranged inside the interchangeable lens 10. The photographing lens 11 is constituted by a plurality of optical lenses, including a focus lens, and forms an optical image of a subject S. Within the interchangeable lens 10 an aperture is arranged in the optical path of the photographing lens 11, and a processor is provided that has an aperture opening detection section for detecting opening of this aperture. An actuator 12 and a lens control section 13 are also provided inside the interchangeable lens 10.

A lens control section 13 has a CPU (Central Processing Unit), peripheral circuits, and a memory that stores programs etc. The lens control section 13 receives a defocus amount from an AF calculation section 23 inside the camera body 20, and performs control of the actuator 12 based on these items of information. The actuator 12 moves the focus lens within the photographing lens 11 in the optical axis direction to perform focusing. It should be noted that position of the focus lens is detected using a lens position detection section (not illustrated), and lens position is transmitted by means of a communication section (not illustrated) to the camera body 20.

An image sensor 21, image processing section 22, AF calculation section 23, and storage section 24 are provided within the camera body 20. The image sensor 21 is arranged on the optical axis of the photographing lens 11, close to a position where a subject image is formed.

The image sensor 21 is provided with a plurality of pixels, and each pixel has a photoelectric conversion section for converting the subject image (optical image) to an electrical signal. Also, the plurality of pixels are of two types, namely imaging pixels and focus detection pixels. The focus detection pixels (also called phase difference detection pixels) limit incident direction of light flux that is incident on a pixel. On the other hand, the imaging pixels do not limit light flux that is incident on the pixel as much as the focus detection pixels. These plurality of pixels are arranged two-dimensionally (refer, for example, to patent application number 2013-201568 regarding pixel arrangement). The image sensor 21 functions as an image sensor that subjects light flux from the imaging optical system to photoelectric conversion using the plurality of pixels and outputs an imaging signal (pixel values).

The image sensor 21 outputs the pixel data (pixel values) that have been output from the focus detection pixels and the imaging pixels to the image processing section 22, AF calculation section 23, and imaging control section 25. The image processing section 22 has an image processing circuit, is input with pixel data from the imaging pixels, among the pixel data, and performs image processing for a live view display image and a storage image. The image processing section 22 also outputs image data that has been processed for storage to the storage section 24. The storage section 24 is an electrically rewritable non-volatile memory, to which image data for storage is input and stored. The image processing section 22 also detects a face of a subject using pixel data, and outputs a central coordinate position of this face, and detects organs such as eyes of the face and outputs a specified coordinate position of this organ (face detection section 22a, which will be described later). The image processing section 22 also performs subject tracking using pixel data (tracking section 22b, which will be described later).

The AF calculation section 23 has a CPU (Central Processing Unit), peripheral circuits, and a memory that stores programs etc. The AF calculation section 23 is input with pixel data from the focus detection pixels, among pixel data, and performs AF calculation based on phase difference AF. At the time of AF calculation, a ranging area (focus detection area) corresponding to position of the focus detection pixels is set based on central coordinate position and specified coordinate position that have been acquired from the image processing section 22, and defocus amount and contrast evaluation value are calculated for this ranging area that has been set. The focus lens within the photographing lens 11 is driven to an in focus position based on this defocus amount and contrast evaluation value that have been calculated.

The imaging control section 25 has an imaging control circuit, and performs readout control of focus detection pixel data from the focus detection pixels of the image sensor 21. The imaging control section 25 functions as an imaging control section that sets readout mode for the image sensor. Also, the AF calculation section 23 executes the various processing that has been described using FIG. 1 to FIG. 6, so that frame addition of focus detection pixel data is performed as little as possible. The AF calculation section 23 also functions as a close to in focus determination section that determines whether or not a focus state that has been detected by focus detection is close to in focus (refer, for example, to S5 in FIG. 10). Also, the imaging control section 25 functions as an exposure control section that controls exposure of the image sensor (refer, for example, to S27 in FIG. 10). The imaging control section 25 also functions as a brightness detection section that detects object brightness.

Also, in a case where a subject is low brightness, as was described using FIG. 5, the imaging control section 25 performs exposure processing again by changing exposure conditions until the shutter speed Tv value and/or the ISO sensitivity Sv value reach their upper limits (refer, for example, to S17 to S23 in FIG. 10).

It should be noted that the image processing section 22, AF calculation section 23 and imaging control section 25 are constituted by one or more processors. The one or more processors can realize some or all of the functions of the previously described imaging control section, close to in focus determination section, exposure control section and brightness detection section. Further, the one or more processors can realize some or all of the functions of a reliability determination section, frame addition section, first filter section, second filter section, focus detection section, detection range changing section, and spatial addition section, which will be described later. A processor may be constructed with hardware circuits, and may be realized using software using a CPU etc.

Figure 8:
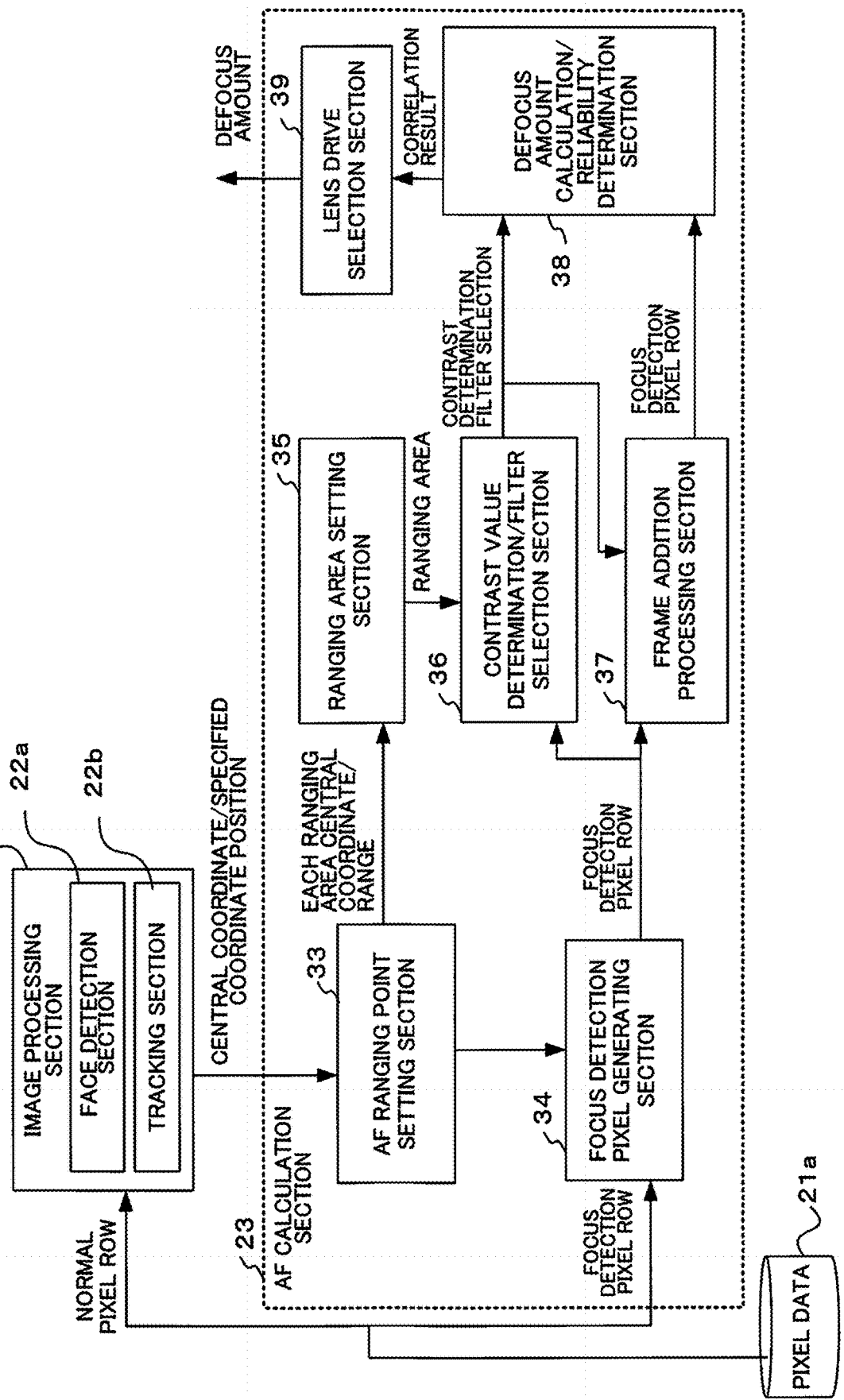
FIG. 8 is a block diagram showing detail of an AF calculation section of a camera of one embodiment of the present invention.

Next, details of the AF calculation section 23 will be described using FIG. 8. Pixel data 21a is pixel data (pixel values) that have been output from the image sensor 21, and is temporarily stored in SDRAM (Synchronous Dynamic Random Access Memory) (not illustrated) or the like.

Also, a face detection section 22a, having a face detection circuit, is provided within the image processing section 22. This face detection section 22a determines whether or not there is a face within a subject image, based on pixel data imaging pixels from the image sensor 21. If the result of this determination is that a face is included in the subject image, the face detection section 22a detects position (central coordinate position of a face range on the image sensor) and size (number of pixels) etc. of the face. Further, detection of organs such as the right ear, left ear, nose etc. is also performed, and specified coordinate position of those organs may also be detected. Central coordinates and specified coordinate positions that have been detected by the face detection section 22a are output to an AF ranging point setting section 33 within the AF calculation section 23.

A tracking section 22b having a tracking circuit is also provided within the image processing section 22. This tracking section 22b performs tracking of a subject based on pixel data of imaging pixels from the image sensor 21. The tracking section 22b compares pixel data, every time pixel data is output from the image sensor 21, for position of a face that has been detected by the face detection section 22a, position of a subject that has been designated by the photographer, for example. Based on this comparison result, the tracking section 22b detects where the same subject has moved to within an imaging region (imaging plane), and tracks the subject based on this detection result. Central coordinate and specified coordinate positions of a tracked object that has been detected by the tracking section 22b are output to an AF ranging point setting section 33 within the AF calculation section 23.

The AF ranging point setting section 33 sets AF ranging point corresponding to central coordinate position and specified coordinate position based on the central coordinate position and specified coordinate position that have been detected by the face detection section 22a or the tracking section 22b. A plurality of ranging points are previously associated with imaging regions (imaging plane) of the image sensor 21. The AF ranging point setting section 33 sets ranging points that are close to the central coordinate position and specified coordinate position, among the plurality of ranging points, and outputs central coordinates of each ranging point that has been set to the ranging area setting section 35 and the focus detection pixel generating section 34. It should be noted that ranging points can also be set manually by the user. The ranging area setting section 35 is input with ranging points that have been set by the AF ranging point setting section 33, and sets a ranging (focus detection) area as a central coordinate of each ranging area. The ranging area setting section 35 then outputs information such as coordinates representing a range of a ranging area to a contrast value determination/filter selection section 36.

The focus detection pixel generating section 34 is input with focus detection pixel data of focus detection pixel rows, among the pixel data 21a. Also, the focus detection pixel generating section 34 is input with central coordinate of a ranging (focus detection) area etc. from the AF ranging point setting section 33, and generates a row of focus detection pixel data that is close to the AF ranging point that has been set from among the focus detection pixel data. This focus detection pixel data that has been generated is output to the contrast value determination/filter selection section 36 and the frame addition processing section 37.

The contrast value determination and filter selection section 36 determines contrast value of focus detection pixel data that has been input from the focus detection pixel generating section 34. As was described using FIG. 2A and FIG. 2B, contrast value is a difference between the maximum value and minimum value of pixel data, and for standard pixel data (pixel data of standard S) and reference pixel data (pixel data of reference R) respective different values are calculated and a smaller difference value is made a contrast value. The contrast value determination/filter selection section 36 outputs a contrast value determination result and a filter selection determination result to the frame addition processing section 37 and a defocus amount calculation/reliability determination section 38. The contrast value determination/filter selection section 36 functions as a reliability determination section that determines reliability of focus detection.

The frame addition processing section 37 has an addition circuit for adding focus detection pixel data for every frame, and is input with focus detection pixel data that has been output from the focus detection pixel generating section 34. The frame addition processing section 37 then outputs focus detection pixel data to the defocus amount calculation/reliability determination section 38 after performing frame addition processing or without performing frame addition processing. Whether to perform or not perform frame addition processing is determined in accordance with conditions (i) to (iii) and conditions (a) and (b) that were described above. The frame addition processing section 37 functions as a frame addition section that generates a picture signal by adding a plurality of imaging signals that have been acquired at different times by the image sensor.

Also, the frame addition processing section 37 has a high frequency band differential filter and a low frequency band differential filter. The frame addition processing section 37 functions as a first filter section that applies a differential filter for a specified frequency band, and a second filter section that supplies a differential filter of a lower frequency band than the first filter section. The filters may use circuit constants of filter circuits such as those disclosed in Japanese patent laid open number 2015-072356, that have been appropriately corrected, for example. The frame addition processing section 37 switches the differential filter based on selection information relating to the differential filter from the contrast value determination/filter selection section 36, as was described using FIG. 2A and FIG. 2B (refer, for example, to S7 in FIG. 10). Specifically, when the contrast value is low there is a switch from the high frequency band differential filter to the low frequency band differential filter. Focus detection pixel data that has been subjected to differential filter processing is output to the defocus amount calculation/reliability determination section 38.

Also, the frame addition processing section 37 selects focus detection pixel data used in focus detection based on information relating to width of a focus detection area from the contrast value determination/filter selection section 36 (whether it is a normal focus detection area or a wide focus detection area), as was described using FIG. 3A and FIG. 3B) (refer, for example, to S9 in Fig, 10). Specifically if contrast value is lower than a specified value, processing for adding focus detection pixel data spatially is executed. The frame addition processing section 37 outputs focus detection pixel data within this focus detection area that has been selected to the defocus amount calculation/reliability determination section 38. The frame addition processing section 37 functions as a detection range changing section that changes a phase difference detection range used by the focus detection section (refer, for example, to S9 in FIG. 10).

The frame addition processing section 37 also has an addition circuit for spatially adding focus detection pixel data, and is input with focus detection pixel data that has been output from the focus detection pixel generating section 34. Then, if an instruction for spatial addition processing is input from the contrast value determination/filter selection section 36, spatial addition processing is executed using focus detection pixel data, as was described using FIG. 4A and FIG. 4B (refer, for example, to S13 in FIG. 10). The frame addition processing section 37 outputs focus detection pixel data that has been subjected to spatial addition processing to the defocus amount calculation/reliability determination section 38. The frame addition section 37 functions as a spatial addition section that spatially adds imaging signals.

The defocus amount calculation/reliability determination section 38 calculates phase difference of focus detection pixel data that has been output from the frame addition processing section 37, taking into consideration a contrast determination result and filter selection result from the contrast value determination/filter selection section 36, and obtains a defocus amount based on this phase difference. Since calculation of this phase difference on defocus amount is a known method, detailed description is omitted. The defocus amount calculation/reliability determination section 38 functions as a focus detection section that performs focus detection using a phase difference detection method based on imaging signals.

Figure 9:
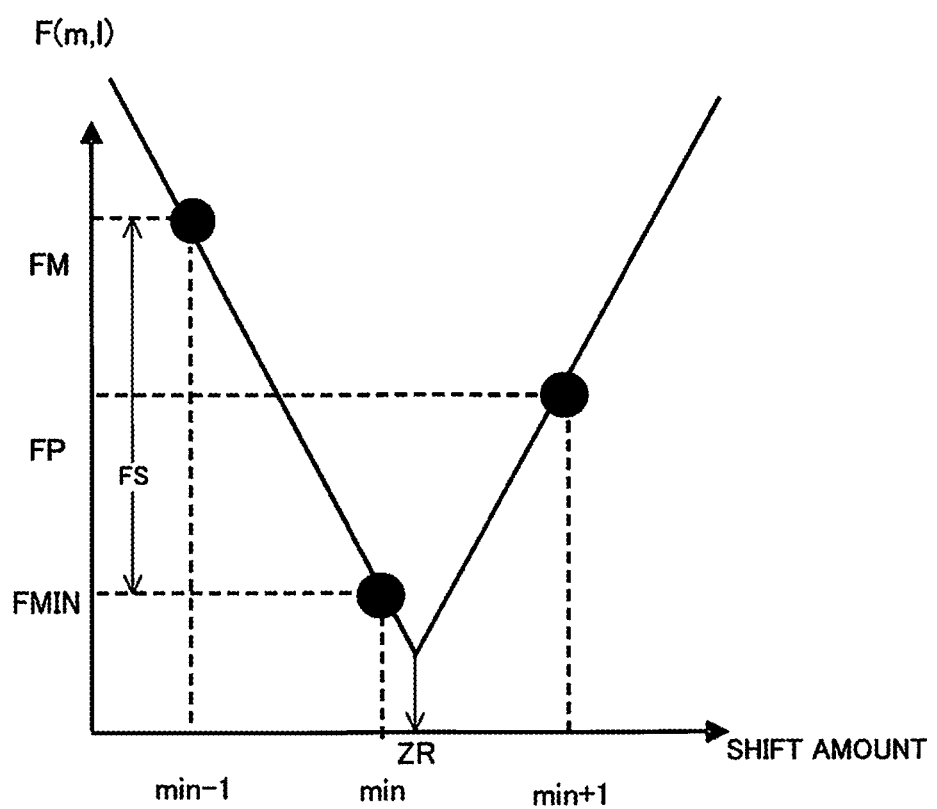
FIG. 9 is a graph showing correlation operation results, and reliability, in the camera of one embodiment of the present invention.

Also, the defocus amount calculation/reliability determination section 38 determines reliability of the defocus amount that has been calculated. Determination of reliability of defocus amount will be described using FIG. 9. FIG. 9 is a graph showing phase position (shift amount) for a pair of focus detection pixel data rows close to where a correlation evaluation value F(m,1) becomes a minimum value, and correlation evaluation value F(m,1). In this graph, for a shift amount of min, correlation evaluation value F(m,1) becomes a minimum. Here, since correlation evaluation value F(m,1) is discrete data, interpolation processing is carried out using a plurality of items of correlation evaluation value F(m,1) in the vicinity of the minimum value, and shift amount ZR corresponding to a true minimum value is calculated. If shift amount ZR is obtained, shift amount ZR is multiplied by a specified coefficient to calculate defocus amount d.

The defocus amount calculating section/reliability determination section 38 uses degree of correlation inclination Fs of the correlation evaluation value F(m,1) as a phase difference AF reliability evaluation value. Specifically, in the example shown in FIG. 9, an inclination Fs[k] of a straight line passing through minimum value (FMIN) of correlation evaluation value F(m,1) and correlation evaluation value FM that is the larger of FM and FP, which are two values of F(m,1) either side of this minimum value FMIN, is made a reliability evaluation value that represents reliability. If this reliability evaluation value is lower than a specified value, it is determined that focus detection is not possible. The defocus amount calculation/reliability determination section 38 may also function as a reliability determination section that determines reliability of focus detection.

A lens drive selection section 39 selects a drive method and drive direction for the photographing lens 11 based on correlation results that have been output from the defocus amount calculation/reliability determination section 38 (defocus amount and defocus direction that have been obtained from results of the correlation operation), and outputs to the lens control section 13. As was described previously the lens control section 13 drives the photographing lens 11 to an in focus position based on defocus amount from the AF calculation section 23.

Next, AF operation of this embodiment will be described using the flowchart shown in FIG. 10. This flow is executed by the CPU etc. that is provided within the AF calculation section 23 controlling each section shown in FIG. 7 and FIG. 8 based on programs that have been stored in non-volatile memory.

If the release button is pressed down half way (1st release), operation in accordance with the flow for AF shown in FIG. 10 is commenced. First, a high frequency band differential filter is applied (S1). In this step, processing using a high frequency band differential filter that was described using FIG. 2A is executed for the focus detection pixel data that has been output from the image sensor 21.

It is next determined whether or not a contrast value is insufficient (S3). In this step, the contrast value determination/filter selection section 36 detects contrast of focus detection pixel data that has been subjected to high frequency band differential filter processing (refer to FIG. 2A and FIG. 2B). The detected contrast value is then compared with a specified value, and if the contrast value is lower than the specified value it is determined that contrast value is insufficient. If the result of this determination is that contrast is not insufficient, processing advances to step S23, where the frame addition processing section 37 outputs the focus detection pixel data that was output from the focus detection pixel generating section 34 as it is, and the defocus amount calculation/reliability determination section 38 calculates defocus amount.

If the result of determination in step S3 is that contrast value is insufficient, it is determined whether or not an in focus state is close (S5). In this step, whether or not an in focus state is close is determined using the focus detection pixel data that was obtained in step S1. Since contrast value is insufficient high precision focus detection cannot be performed, but it may be understood whether or not an in focus state is close (that is, whether detected shift amount (phase difference amount)) is within a specified range, or whether detected defocus amount is within a specified range.

If the result of determination in step S5 is close to in focus, a low frequency band differential filter is applied (S7). As was described using FIG. 2B, if the contrast value is insufficient it is possible to improve contrast value by using a low frequency band differential filter. In this step the frame addition processing section 37 switches to the low frequency band differential filter and processes the focus detection pixel data.

On the other hand, if the result of determination in step S5 is not close to in focus, a correlation operation range is widened and low frequency band differential filter is applied (S9). As was described using FIG. 3B, if contrast is insufficient it is possible to improve contrast by widening the focus detection area from a normal focus detection area to a wide focus detection area. In this step, the frame addition processing section 37 switches the focus detection area to a wide focus detection area and processes the focus detection pixel data.

If processing has been executed in steps S7 or S9, it is next determined whether or not contrast value is insufficient (S11). In this step, the contrast value determination/filter selection section 36 detects contrast value of focus detection pixel data that was subjected to processing in step S7 or S9. The detected contrast value is then compared with a specified value, and if the contrast value is lower than the specified value it is determined that contrast value is insufficient. If the result of this determination is that contrast value is not insufficient, processing advances to step S23. The defocus amount calculation/reliability determination section 38 calculates defocus amount using focus detection pixel data that was processed by the frame addition processing section 37.

If the result of determination in step S11 is that contrast is not insufficient, pixel data is spatially added (S13). As was described using FIG. 4A, if the contrast value is insufficient it is possible to improve contrast value by performing spatial addition. In this step, the frame addition processing section 37 performance spatial addition processing on the focus detection pixel data.

If spatial addition processing has been performed in step S13, it is next determined whether or not contrast value is insufficient (S15). In this step, the contrast value determination/filter selection section 36 detects contrast value of focus detection pixel data that was subjected to spatial addition processing in step S13. The detected contrast value is then compared with a specified value, and if the contrast value is lower than the specified value it is determined that contrast value is insufficient. If the result of this determination is that contrast value is not insufficient, processing advances to step S23. The defocus amount calculation/reliability determination section 38 calculates defocus amount using focus detection pixel data for which spatial addition processing was performed by the frame addition processing section 37.

On the other hand, if the result of determination in step S15 is that contrast value is insufficient, it is determined whether or not exposure time or ISO sensitivity are at their upper limit (S17). An upper limit of shutter speed Tv value, which is exposure time, is a value that is determined according to frame rate. Also, the upper limit for ISO sensitivity Sv value is determined in advance in accordance with noise level generated by the image sensor. In this step, as was described using FIG. 5, it is determined whether or not exposure conditions for AF (shutter speed TV value and ISO sensitivity Sv value) have reached their upper limits.

If the result of determination in step S17 is that upper limits have not been reached then exposure conditions are changed and shutter speed Tv or ISO sensitivity raised to increase exposure value, so as to increase the values of the focus detection pixel data, and exposure is performed again (S27). Specifically, if the upper limits have not been reached then exposure conditions are change so as to increase values of the focus detection pixel data, and exposure is performed again with these changed exposure conditions. If the exposure that has been performed again is complete, processing is executed from step S1.

If the result of determination in step S17 is that shutter speed Tv value and ISO sensitivity Sv value have reached their upper limits, it is determined whether or not there are low brightness conditions (S19). If the result of this determination is that there are not low brightness conditions, a lens scan operation is executed (S29).

On the other hand, if the result of determination in step S19 is that there are low brightness conditions, pixel data is added in time series (S21). As has been mentioned above, addition of focus detection pixel data every time focus detection pixel data is output from the image sensor 21 (every frame) is not preferable as it takes a lot of processing time. However, since contrast value is not increased, even though processing of steps S3 to S19 has been performed, in this step pixel data is added in time series, as was described using FIG. 6. In this addition of pixel data, during a shooting preparation operation (maintaining 1st release), the number of frame additions is controlled in accordance with the previously described conditions (i) to (iii) and (a) and (b), so that change in calculated conditions can be prevented from occurring frequently.

Next, ranging computation is performed (S23). In the case of performing ranging computation by way of steps S3, S11, S15, S17 and S19, processing is as described above. If pixel data for two frames (or for three or more frames) has been added in time series in step S21, a correlation operation is performed using this pixel data that has been added, and defocus amount is calculated. Once ranging computation has been performed in step S23, the flow for AF operation is terminated. In a case where a shooting preparation operation (1st release button is continuously pressed down) is in progress, the flow for AF operation is executed again repeatedly from step S1. If the 1st release button is not being pressed down (finger has been taken off), then once the shooting preparation operation (operation of 1st release button) is performed again, processing is performed from step S1.

As has been described above, with the one embodiment of the present invention, first focus detection is performed based on a signal resulting from subjecting an imaging signal to first filter processing using a high frequency band differential filter (also called a first filter section) (refer, for example, to FIG. 2A and S1 in FIG. 10). In the event that it is determined by the reliability determination section that reliability of first focus detection is lower than a specified value (refer to S3 in FIG. 10), second focus detection is performed based on a signal resulting from subjecting the imaging signal to second filter processing using a low frequency band differential filter (also called a second filter section) (refer, for example, to FIG. 2B and S9 in FIG. 10). If it is determined by the reliability determination section that reliability of second focus detection result is lower than a specified value (refer to S15 in FIG. 10), then third focus detection is performed based on a picture signal that has been acquired from a frame addition section (refer, for example, to S21 and S23 in FIG. 10). In this way, in the event that reliability of focus detection is low, since the focus detection is performed by changing characteristics of a differential filter, it is possible to reduce the number of times that time series addition of focus detection pixel data is performed.

Also, with the one embodiment of the present invention, in a case where first focus detection is performed based on an imaging signal (refer, for example, to FIG. 2A and S1 in FIG. 10), and it is determined by the reliability determination section that reliability of the first focus detection is lower than a specified value, a phase difference detection range is widened by a detection range changing section (refer, for example, to FIG. 2B and S9 in FIG. 10). If second focus detection is performed based on an imaging signal in this phase difference detection range that has been widened, and it is determined by the reliability determination section that reliability of the second focus detection result is lower than a specified value (refer, for example, to S11 in FIG. 10), then third focus detection is performed based on a picture signal that has been acquired from a frame addition section (refer, for example, to S21 and S23 in FIG. 10). In this way, in the event that reliability of focus detection is low, since the focus detection is performed by changing a range for phase difference detection, it is possible to reduce the number of times that time series addition of focus detection pixel data is performed.

Also, with the one embodiment of the present invention, in a case where first focus detection is performed based on an imaging signal (refer, for example, to S1 in FIG. 10), and it is determined by the reliability determination section that reliability of the first focus detection is lower than a specified value (refer, for example, to S11 in FIG. 10), second focus detection is performed based on a signal resulting from having added imaging signals using a spatial addition section (refer, for example, to FIG. 4A and S13 in FIG. 10). If it is determined by the reliability determination section that reliability of second focus detection result is lower than a specified value (for example, S15 in FIG. 10), then third focus detection is performed based on a picture signal that has been acquired from a frame addition section (refer, for example, to S21 and S23 in FIG. 10). In this way, in the event that reliability of focus detection is low, since the focus detection is performed by spatially adding picture signals, it is possible to reduce the number of times that time series addition of focus detection pixel data is performed.

Also, with the one embodiment of the present invention, when it is determined that results of first focus detection are not close to in focus (refer, for example, to S5 in FIG. 10), and it is determined by the reliability determination section that reliability of second focus detection is lower than a specified value, the focus detection section executes third focus detection based on a picture signal that has been acquired by a frame addition section (refer, for example, to S21 and S23 in FIG. 10). In this way, it is possible to reduce the number of times that time series addition of focus detection pixel data is performed.

Also, with the one embodiment of the present invention, if it has been determined that reliability of second focus detection is low, the focus detection section executes third focus detection in accordance with exposure conditions of the exposure control section (refer, for example, to S19 in FIG. 10). Also, in a case where exposure time, which is an exposure condition of the image sensor, is longer than a specified time, or if imaging sensitivity is higher than a specified value, third focus detection is executed (refer, for example, to S17 in FIG. 10). Also, in a case where exposure time, which is an exposure condition of the image sensor, is shorter than a specified time, and imaging sensitivity is lower than a specified value, first focus detection is performed by executing exposure of the image sensor again by the exposure control section, with either exposure time lengthened or imaging sensitivity raised (refer, for example, to S17 and S27 in FIG. 10).

Also, with the one embodiment of the present invention, a number of additions by the frame addition section is determined by the focus detection section based on reliability of the second focus detection (refer, for example, to FIG. 6 and conditions (i) to (iii), and (a) and (b)). Also, if it has been determined that reliability of the second focus detection is low, the focus detection section determines whether or not to execute third focus detection in accordance with subject brightness, aperture opening, or readout mode (refer, for example, to FIG. 5 and S19 in FIG. 10).

Also, with the one embodiment of the present invention, first focus detection is performed based on an imaging signal, and if reliability that has been determined by the reliability determination section is lower than the specified value it is determined whether or not to execute second focus detection based on a picture signal that has been acquired by the frame addition section, in accordance with explosion conditions of the exposure control section (refer, for example, to S17 and S19 in FIG. 10). In this way, in the event that reliability of focus detection is low, since exposure conditions of the exposure control section are changed first, it is possible to reduce the number of times that time series addition of focus detection pixel data is performed.

Also, with this embodiment, a high frequency band differential filter is applied in order to emphasize a subject pattern of focus detection pixel data. Contrast value is obtained from a difference between maximum value and minimum value of pixel data to which a differential filter has been applied (refer, for example, to FIG. 2A and FIG. 2B). If this contrast value does not exceed a specified threshold value, it is determined that a subject pattern is low contrast. If it has been determined that a subject pattern is low contrast, then if there is a close to in focus state a low frequency band differential filter is applied (refer, for example, to FIG. 2B and S7 in FIG. 10). In this way the contrast value exceeds a specified threshold value and focus detection becomes possible. On the other hand, in a defocused state a low-frequency band differential filter is applied, and a range for correlation operation (focus detection area) is made wider than normal (refer to FIG. 3B and S9 in FIG. 10). In this way the contrast value exceeds a specified threshold value and focus detection becomes possible.

Also, with this embodiment, in a case where contrast value is insufficient, even though a low-frequency band differential filter, and a correlation operation in a wide range (focus detection area), have been applied (refer, for example, to S11 in FIG. 10), low brightness conditions are determined using a combination of subject brightness, current aperture value of the interchangeable lens and imaging read-out mode, and operation of time series frame addition processing is determined (refer, for example, to FIG. 5 and S17 and S19 in FIG. 10). It is therefore possible to reduce the number of times that time series addition of focus detection pixel data is performed.

Also, with this embodiment, with low brightness conditions, in the event that contrast value is insufficient even with appropriate focus conditions for focus detection pixels, priority is given to increasing exposure time and ISO sensitivity to their upper limits and repeatedly performing exposure again, but if contrast value is insufficient even if the upper limits for exposure time and ISO sensitivity have been reached, it is determined whether or not to perform time series frame addition processing (refer, for example, to FIG. 5 and S17 and S19 in FIG. 10). It is therefore possible to reduce the number of times that time series addition processing is performed.

Also, with this embodiment, in the time series frame addition processing, a number of frames of focus detection pixel data to be added can be increased or decreased in accordance with conditions (refer, for example, FIG. 6 and conditions (i) to (iii), and (a) and (b)). As a result it is possible to prevent time series frame addition processing changing frequently.

It should be noted that with the one embodiment of the present invention, processing is performed in the order (1) changing frequency band of differential filter, (2) changing correlation operation range (focus detection area), (3) spatial addition of pixel data, (4) changing exposure conditions. However this order is not limited to the order described above, and some of these processes may be performed in parallel. For example, respective ranging computations maybe performed using two sets of focus detection pixel data that have been processed by both a high frequency band differential filter and a low frequency band differential filter, or respective ranging computations may be performed using two sets of focus detection pixel data that have been output from both a normal focus detection area and a wide focus detection area. These combinations and orders may be arbitrarily changed. Further, any of (1) to (3) described above may be omitted, and other processes may be added.

Also, with the one embodiment of the present invention, reliability determination is performed using contrast value. However, the present invention is not limited to contrast value, and reliability may be determined using reliability results of correlation operation, as shown in FIG. 9, or may be determined using both contrast value and reliability of correlation operations.

Also, with the one embodiment of the present invention so-called imaging plane phase difference AF where phase difference AF detection pixels are arranged on an image sensor 21 is adopted for the purpose of phase difference AF detection. However, this is not limiting and a phase difference detection section may be provided separately to the image sensor 21.

Also, with the one embodiment of the present invention, the face detection section 22a and tracking section 22b within the image processing section 22 respectively have a face detection circuit and tracking circuit, but instead of hardware circuits they may also be configured as software using a CPU and programs, may be implemented by hardware circuits such as gate circuits that are generated based on a programming language described using Verilog, or may use be configured using a DSP (Digital Signal Processor). Suitable combinations of these approaches may also be used. The use of a CPU is also not limiting as long as elements fulfill a function as a controller.

Also, regarding each of the sections with the AF calculation section 23, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Calculation of defocus amount, evaluation of reliability calculation of contrast evaluation values, and generation of phase difference pixels etc. has been performed by repeating uniform calculation processing, but these operations may also be configured using hardware circuits. Also, without being limited to a CPU, processes of each of the above described sections may be performed by one or more processors constructed as hardware, as long as there are elements providing functions as a controller. For example, each section may be a processor that is constructed as respective electronic circuits, and may be each circuit section of a processor that is constructed with integrated circuits such as an FPGA (Field Programmable Gate Array). Also, a processor that is constructed of one or more CPUs may execute the functions of each section, by reading out and executing computer programs that have been stored in a storage medium.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to adopt the present invention as long as a device carries out focus detection using a phase difference detection method.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection device, comprising:
an image sensor that subjects light flux from an imaging optical system to photoelectric conversion using a plurality of pixels, and outputs an imaging signal; and
one or more processors constructed in hardware, wherein the processor,
performs focus detection using a phase difference detection method based on the imaging signal,
determines reliability of the focus detection,
generates a picture signal by adding a plurality of imaging signals that have been acquired at different times by the image sensor,
performs first filter processing to apply a differential filter for a specified frequency band, and
performs second filter processing to apply a differential filter for a frequency band that is lower than that for the first filter processing,
wherein the focus detection performs first focus detection based on a signal that has been obtained by subjecting the imaging signal to the first filter processing, performs second focus detection based on a signal that has been obtained by subjecting the imaging signal to the second filter processing if reliability of the first focus detection is lower than a specified value, and if it is determined that reliability of the second focus detection is lower than a specified value, executes third focus detection based on a picture signal that has been obtained by adding the plurality of imaging signals that have been obtained at different times.

2. The focus detection device of claim 1, wherein:
the one or more processors
determine whether or not a focus state that has been detected by the focus detection is a close to in focus state; and
if it is determined that first focus detection is not close to in focus, in the event that it is determined that reliability of the second focus detection is lower than a specified value, executes third focus detection based on a picture signal that has been obtained by addition of a plurality of imaging signals that have been acquired at different times.

3. The focus detection device of claim 1, wherein:
the one or more processors
control exposure of the image sensor based on exposure conditions; and
if it has been determined that reliability of the second focus detection is low, determine whether or not to execute the third focus detection in accordance with the exposure conditions.

4. The focus detection device of claim 3, wherein:
the one or more processors
execute the third focus detection if exposure time, which is an exposure condition of the image sensor, is longer than a specified time, and imaging sensitivity is higher than a specified value.

5. The focus detection device of claim 3, wherein:
the one or more processors
in a case where exposure time, which is an exposure condition of the image sensor, is shorter than a specified time, or imaging sensitivity is lower than a specified value, perform the first focus detection by executing exposure of the image sensor, with either exposure time lengthened or imaging sensitivity raised.

6. The focus detection device of claim 1, wherein:
the one or more processors
determine a number of additions of imaging signals that have been acquired at different times, based on reliability of the second focus detection.

7. The focus detection device of claim 1, wherein:
the one or more processors
detect subject brightness;
detect opening of an aperture of the imaging optical system having the aperture; and
set readout mode of the image sensor,
wherein, if it has been determined that reliability of the second focus detection is low, it is determined whether or not to execute the third focus detection in accordance with the subject brightness, the aperture opening, or the readout mode.

8. A focus detection device, comprising
an image sensor that subjects light flux from an imaging optical system to photoelectric conversion using a plurality of pixels, and outputs an imaging signal; and
one or more processors constructed in hardware, the one or more processors,
performing focus detection using a phase difference detection method based on the imaging signal,
changing phase difference detection range when performing the focus detection,
determining reliability of the focus detection, and
generating a picture signal by adding a plurality of imaging signals that have been acquired at different times by the image sensor,
wherein the focus detection performs first focus detection based on the imaging signal, if reliability of the first focus detection is lower than a specified value, widens the phase difference detection range and performs second focus detection based on the imaging signal of this phase difference detection range that has been expanded, and if it is determined that reliability of the second focus detection is lower than a specified value executes third focus detection based on a picture signal that has been obtained by adding the plurality of imaging signals that have been obtained at different times.

9. A focus detection method for an imaging device, that comprises an image sensor that subjects light flux from an imaging optical system to photoelectric conversion using a plurality of pixels, and outputs a picture signal, a first filter circuit that applies a differential filter of a specified frequency band, and a second filter circuit that applies a differential filter of a frequency band that is lower than that for the first filter circuit, comprising:
performing focus detection using a phase difference detection method based on the imaging signal,
determining reliability of the focus detection, and
generating a picture signal by adding a plurality of imaging signals that have been acquired at different times by the image sensor,
wherein the focus detection performs first focus detection based on a signal that has been obtained by processing the imaging signal using the first filter circuit, performs second focus detection based on a signal that has been obtained by processing the imaging signal using the second filter circuit if reliability of the first focus detection is lower than a specified value, and if it is determined that reliability of the second focus detection is lower than a specified value executes third focus detection based on a picture signal that has been obtained by adding the plurality of imaging signals that have been obtained at different times.

10. The focus detection method of claim 9, wherein:
the focus detection determines whether or not a focus state that has been detected by the focus detection is a close to in focus state; and
if it is determined that first focus detection is not close to in focus, in the event that it is determined that reliability of the second focus detection is lower than a specified value, executes third focus detection based on a picture signal that has been obtained by addition of a plurality of imaging signals that have been acquired at different times.

11. The focus detection method of claim 9, further comprising:
controlling exposure of the image sensor based on exposure conditions; and wherein
if it has been determined that reliability of the second focus detection is low, the focus detection determines whether or not to execute the third focus detection in accordance with the exposure conditions.

12. The focus detection method of claim 11, wherein:
the focus detection executes the third focus detection if exposure time, which is an exposure condition of the image sensor, is longer than a specified time, and imaging sensitivity is higher than a specified value.

13. The focus detection method of claim 11, wherein:
the focus detection, in a case where exposure time, which is an exposure condition of the image sensor, is shorter than a specified time, or imaging sensitivity is lower than a specified value, performs the first focus detection by executing exposure of the image sensor, with either exposure time lengthened or imaging sensitivity raised.

14. The focus detection method of claim 9, wherein:
the focus detection determines a number of additions of imaging signals that have been acquired at different times, based on reliability of the second focus detection.

15. The focus detection method of claim 9, further comprising:
detecting subject brightness;
detecting opening of an aperture of the imaging optical system having the aperture; and
setting readout mode of the image sensor,
wherein, if it has been determined that reliability of the second focus detection is low, the focus detection determines whether or not to execute the third focus detection in accordance with the subject brightness, the aperture opening, or the readout mode.

16. A focus detection method for an imaging device that comprises an image sensor that subjects light flux from an imaging optical system to photoelectric conversion using a plurality of pixels, and outputs an imaging signal, comprising:
performing focus detection using a phase difference detection method based on the imaging signal,
changing phase difference detection range when performing the focus detection,
determining reliability of the focus detection, and
generating a picture signal by adding a plurality of imaging signals that have been acquired at different times by the image sensor,
wherein the focus detection performs first focus detection based on the imaging signal, if reliability of the first focus detection is lower than a specified value, widens the phase difference detection range and performs second focus detection based on the imaging signal of this phase difference detection range that has been expanded, and if it is determined that reliability of the second focus detection is lower than a specified value, executes third focus detection based on a picture signal resulting from adding the plurality of imaging signals that have been obtained at different times.

* * * * *